US011847168B2

(12) United States Patent
Guo et al.

(10) Patent No.: US 11,847,168 B2
(45) Date of Patent: Dec. 19, 2023

(54) TRAINING MODEL WITH MODEL-PROVIDED CANDIDATE ACTION

(71) Applicant: Microsoft Technology Licensing, LLC, Redmond, WA (US)

(72) Inventors: Alan Xinyu Guo, Boston, MA (US); Jesse Daniel Eskes Rusak, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 626 days.

(21) Appl. No.: 16/723,889

(22) Filed: Dec. 20, 2019

(65) Prior Publication Data

US 2021/0192283 A1 Jun. 24, 2021

(51) Int. Cl.
*G06F 16/9032* (2019.01)
*G06N 20/00* (2019.01)
*G06F 18/214* (2023.01)
*G06F 18/21* (2023.01)
*G06N 3/08* (2023.01)

(52) U.S. Cl.
CPC .... *G06F 16/90332* (2019.01); *G06F 18/2148* (2023.01); *G06F 18/2178* (2023.01); *G06N 3/08* (2013.01); *G06N 20/00* (2019.01)

(58) Field of Classification Search
None
See application file for complete search history.

(56) References Cited

U.S. PATENT DOCUMENTS

| 11,055,355 | B1 * | 7/2021 | Monti | G06F 16/90332 |
|---|---|---|---|---|
| 2017/0169354 | A1 * | 6/2017 | Diamanti | G06N 5/04 |
| 2017/0316777 | A1 * | 11/2017 | Perez | G06F 40/35 |
| 2019/0066660 | A1 * | 2/2019 | Liang | G06F 40/169 |
| 2019/0237061 | A1 * | 8/2019 | Rusak | G10L 15/063 |
| 2020/0125801 | A1 * | 4/2020 | Beaver | G06F 40/279 |
| 2020/0251091 | A1 * | 8/2020 | Zhao | G06N 3/04 |

OTHER PUBLICATIONS

Einolghozati, et al., "Improving Robustness of Task Oriented Dialog Systems", in repository of arXiv:1911.05153v1, Nov. 12, 2019, pp. 1-10.
Gan, et al., "Improving the Robustness of Question Answering Systems to Question Paraphrasing", In Proceedings of the 57th Annual Meeting of the Association for Computational Linguistics, Jul. 28, 2019, pp. 6065-6075.
He, et al., "Revisiting Self-Training for Neural Sequence Generation", In repository of arXiv:1909.13788v1, Sep. 30, 2019, pp. 1-13.

(Continued)

*Primary Examiner* — Antim G Shah
(74) *Attorney, Agent, or Firm* — Alleman Hall Creasman & Tuttle LLP

(57) ABSTRACT

A method of training a conversational computing system. The method includes providing an initial query to a machine learning model previously trained to generate actions for responding to a query. Based on the initial query, a plurality of candidate actions are received from the machine learning model and presented via a training interface. Based on input provided by the human annotator, a selected candidate action is recognized and associated with the initial query in a labeled data example.

20 Claims, 7 Drawing Sheets

(56) References Cited

OTHER PUBLICATIONS

McClosky, et al., "Effective Self-training for Parsing", In Proceedings of the Human Language Technology Conference of the North American Chapter of the ACL, Jun. 4, 2006, pp. 152-159.

"International Search Report and Written Opinion Issued in PCT Application No. PCT/US2020/058996", dated Mar. 4, 2021, 13 Pages.

Sachan, et al., "Self-Training for Jointly Learning to Ask and Answer Questions", In Proceedings of the Conference of the North American Chapter of the Association for Computational Linguistics: Human Language Technologies, vol. 1, Jun. 1, 2018, pp. 629-640.

* cited by examiner

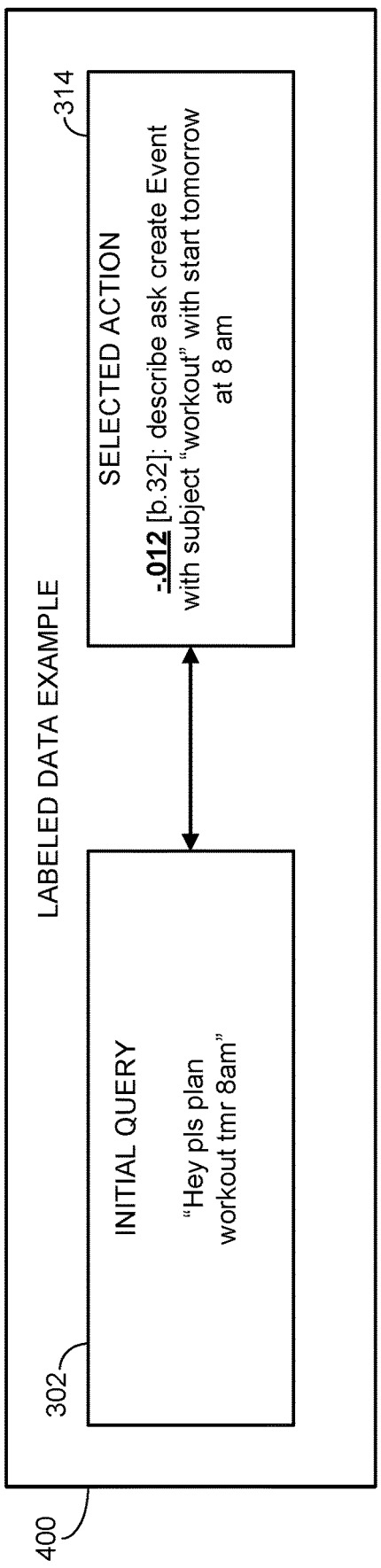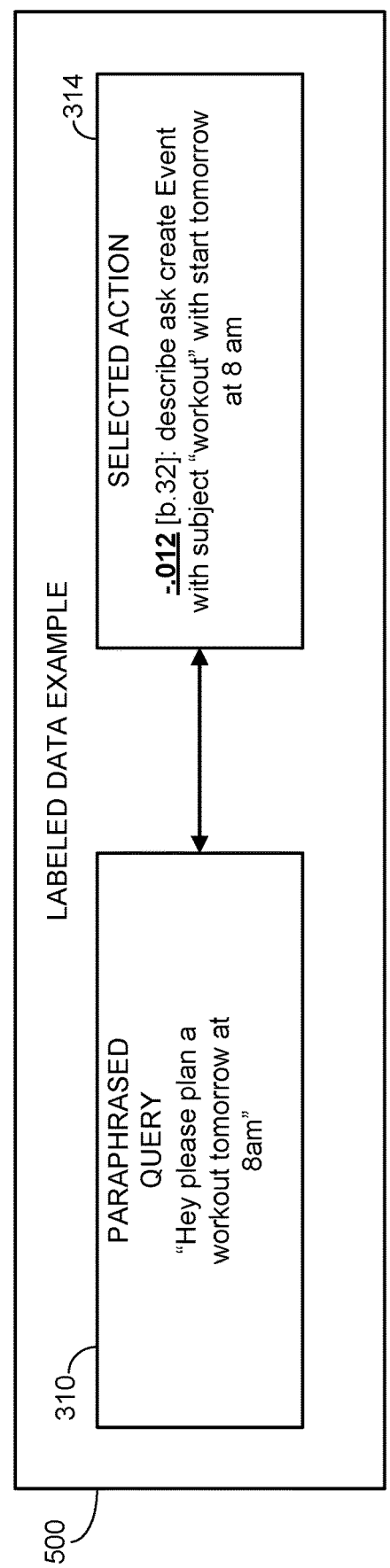

TRAINING MODEL WITH MODEL-PROVIDED CANDIDATE ACTION

BACKGROUND

Conversational computing systems that utilize machine learning or other artificial intelligence techniques may be trained to respond to different kinds of user utterances, for example by performing computer operations and producing descriptive content based on results of the computer operations (e.g., outputting a response utterance and/or presenting graphical user interface content). As an example, a conversational computing system may be trained to respond to a user saying, "What'll the weather be like?" by querying a network-accessible weather service for tomorrow's weather report, and outputting a response utterance based on the weather report.

Training of such conversational computing systems can be time consuming and challenging. Such training often requires thousands of different training examples to be labeled by human annotators. Some training systems require the human annotators to be highly-skilled and capable of labeling training data with labels having a rigid syntax.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of training a conversational computing system includes providing an initial query to a machine learning model previously trained to generate actions for responding to a query. Based on the initial query, a plurality of candidate actions are received from the machine learning model and presented via a training interface. Based on input provided by the human annotator, a selected candidate action is recognized and associated with the initial query in a labeled data example.

BRIEF DESCRIPTION OF THE DRAWINGS

FIG. 4 schematically depicts a labeled training example including an initial query and a selected candidate action.

FIG. 5 schematically depicts a different labeled training example including a paraphrased query and a selected candidate action.

DETAILED DESCRIPTION

Conversational computing systems enable human users to interact with computers in a more natural manner. A properly trained conversational computing system is able to process natural user interactions such as spoken user utterances or written user commands, without requiring the user to use a particular syntax defined by the computer. This allows the human user to use natural language when addressing the computer.

For example, the user may interact using natural language by asking the computer to answer a question or by giving the computer a command. In response, the conversational computing system is trained to automatically perform actions, such as answering questions or otherwise assisting a user (e.g., reporting today's weather forecast in response to the human saying or typing "What is the weather like?"). The conversational computing system may respond to the user request with any suitable computer operations, for example outputting synthesized speech via a speaker, and/or interacting with other computer technologies via application programming interfaces (APIs) to find search results, make purchases, and/or schedule appointments.

Figure 1:
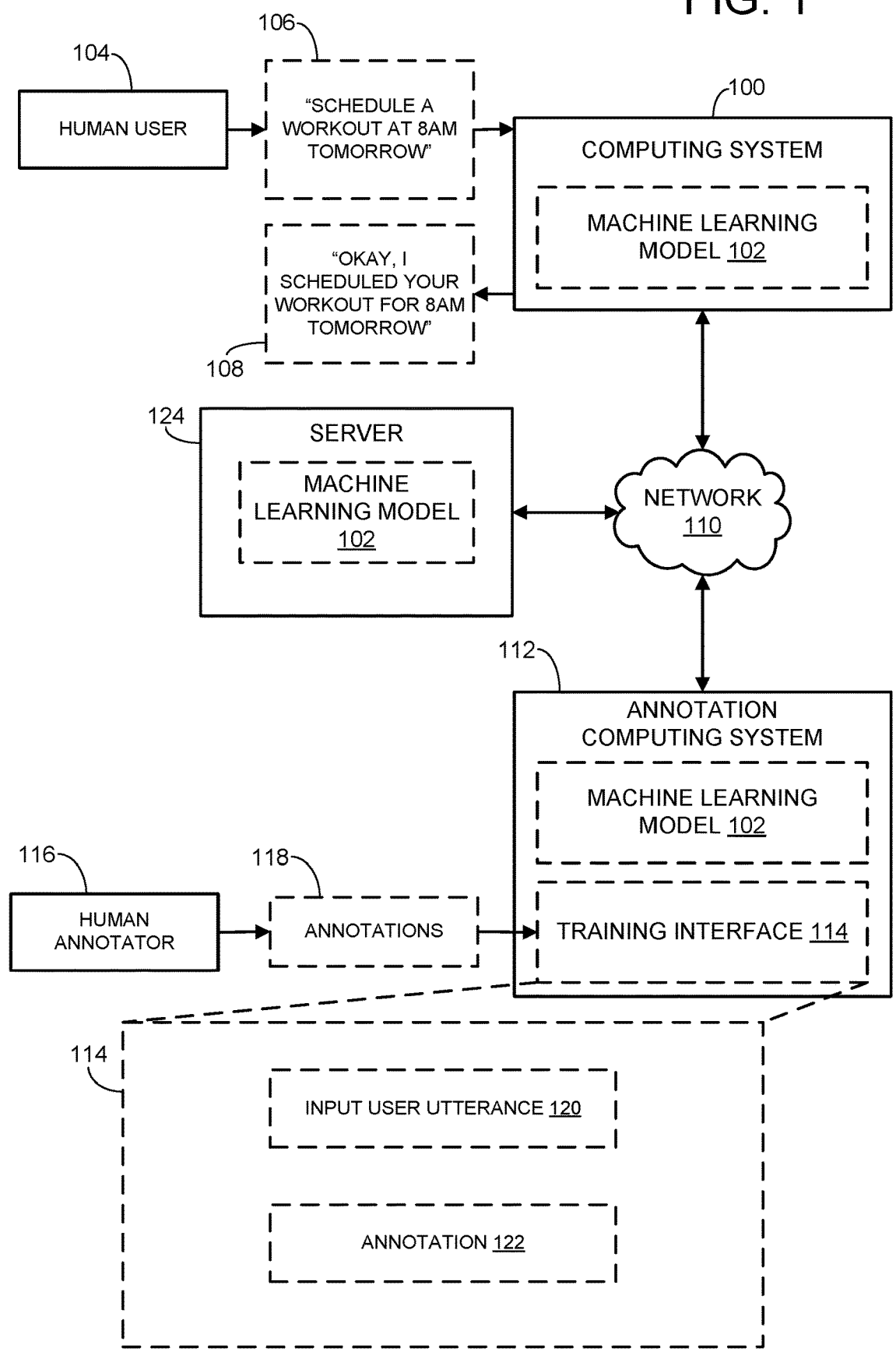
FIG. 1 schematically depicts an example environment for training a conversational computing system.

This is illustrated in FIG. 1, which schematically shows an example conversational computing system 100 implementing a machine learning model 102. A conversational computing system may have any suitable hardware configuration and form factor. As examples, a conversational computing system may be a laptop computer, desktop computer, smartphone, tablet, media center, smart speaker device, smart watch, mixed reality device, or Internet of Things (IoT) device (e.g., smart thermostat, light controller, security camera). In some examples, a conversational computing system may be implemented as computing system 700 described below with respect to FIG. 7.

Conversational computing systems may be configured to respond to various user interaction events. In the example of FIG. 1, a human user 104 provides a user query 106: "Schedule a workout at 8 AM tomorrow." Examples of events include user utterances in the form of speech and/or text, button presses, network communication events (e.g., receiving a result of an API call), and/or gesture inputs. More generally, events include any occurrences that may be relevant to user interaction and that are detectable by a conversational computing system, for example via input hardware (e.g., microphones, cameras, keyboards, and/or touch-screens), communication hardware, and the like. Such events may be represented in a computer-readable format, such as a text string generated by a speech-to-text interpreter or screen coordinate values associated with touch inputs.

Conversational computing systems may be configured to perform any suitable actions to assist a user. Again using the example of FIG. 1, after human user 104 provides the query 106, the conversational computing system generates a response 108: "Okay, I scheduled your workout for 8 AM tomorrow." Examples of actions include performing computations, controlling other computers and/or hardware devices, (e.g., by invoking an API), communicating over networks (e.g., to invoke an API), receiving user input (e.g., in the form of any detectable event), and/or providing output (e.g., in the form of displayed text and/or synthesized speech). More generally, actions may include any behaviors that a computer system is configured to perform. Other non-limiting examples of actions include controlling electronic devices (e.g., turning on/off lights in a user's home, adjusting a thermostat, and/or playing multimedia content via display/speakers), interacting with commercial and/or other services (e.g., invoking an API to schedule a ride via a ride-hailing service and/or ordering food/packages via a delivery service), and/or interacting with other computer systems (e.g., to access information from a website or database, send an email, and/or access a user's schedule in a calendar program).

As used herein, a computer-executable plan is a nonlimiting example for implementing an action of the conversational computing system. "Plan" is used herein to refer to any suitable representation of steps that may be taken by a computer in order to perform the corresponding action. For example, a computer-executable plan may include computer-executable code configured to cause a computer to perform computational steps for carrying out the corresponding action. As a non-limiting example, the computer-executable plan may include computer-executable bytecode in a data-flow programming language (e.g., in a data-flow programming language used by conversational computing system 100 or in any other suitable programming language). Alternately or additionally, the computer-executable plan may include any other suitable data for representing computational steps and data flow and/or control flow related to the computational steps, for example any suitable computer functions and/or operations, arranged in any suitable sequence, tree, graph, and/or hypergraph. A conversational computing system that enacts a plan (e.g., by generating and/or at least partially executing the plan) may be able to automatically employ complex conversational approaches in response to an input event. For example, the plan may enable the conversational computing system to take initiative to effectively handle the input event, ask appropriate questions of a user (e.g., to seek clarification if there is an ambiguity, and/or to seek confirmation before automatically making a decision), describe the results of enacting a plan, and/or describe the process of obtaining the results (e.g., describing steps in the plan itself).

Accordingly, by recognizing various events and in response, performing relevant actions, conversational computing systems enable users to use conversation, gesture, and other modes of expression to control a computer to perform any suitable tasks.

The present disclosure includes techniques for language generation in conversational computing systems. The machine learning model may be trained to respond to a particular input utterance by generating one or more candidate actions, where each candidate action is associated with a computer-executable plan. For example, data may be obtained from human engineers who may have extensive knowledge of the machine learning model, and/or from less-skilled human annotators who may perform one or more annotation tasks related to the machine learning model, for example ranking candidate actions and/or responses, and/or providing exemplary actions and/or responses.

This is also schematically illustrated in FIG. 1. As shown, conversational computing system 100 is communicatively coupled with a network 110, which may be any suitable computer network including the Internet. Also coupled to network 110 is an annotation computing system 112 configured to implement a training interface 114 usable for training a machine learning model as described above. Specifically, a human annotator 116 provides annotations to annotation computing system 112 via the training interface 114. For example, as is schematically shown, the training interface may present an input user utterance 120, and the human annotator may provide an annotation 122 that includes a response utterance, selected candidate action, computer-executable plan, or other suitable instruction. The input user utterance and annotation may then be stored as a labeled data example and used to retrain the machine learning model. In some cases, the annotation computing system may also implement the machine learning model, such that the annotation computing system may dynamically generate computer-executable plans in response to queries input via the training interface.

Notably, in this example, the training interface is presented via annotation computing system 112. The training interface may therefore be rendered by a software application executed by the annotation computing system. Alternatively, the training interface may be generated by a software application executed by a different computing device, such as a server 124, and accessed by the annotation computing system—e.g., via a web interface or API. For example, the annotation computing system may include a communication subsystem, and the training interface may be presented by the server providing computer-executable interface code to the annotation computing system via the communication subsystem. The training interface may then be presented visually via a display subsystem of the annotation computing system.

Similarly, in FIG. 1, the conversational computing system is in the same local environment as human user 104. In other words, the same computing system records the user utterance, processes the utterance via the machine learning model, and executes a computer-executable plan. In other examples, however, the conversational computing system may be remote from the human user—e.g., implemented as a server 124. Thus, a device in the human user's local environment may record the user's utterance and transmit the utterance over a network to server 124, which may then provide the utterance to an instance of machine learning model 102 executed on the server. A computer-executable plan generated by the machine learning model may then be transmitted to and carried out by the device in the user's local environment (e.g., computing system 100).

The conversational computing system and annotation computing system need not be network connected. For example, training of the machine learning model via the training interface may be done offline. Once the model is sufficiently trained, it may be copied to a different system —e.g., a personal assistant computing system or a network-accessible server.

However, providing annotations effectively can be difficult and error-prone for the human annotators, often requiring specialized training in creating computer-executable plans. For example, human annotators may often be required to have extensive knowledge in a data-flow programming language having rigorous formatting and syntax requirements. This can present a significant bottleneck in the model training process, as it can take significant resources to recruit and train a sufficient group of human annotators to train a machine learning model, especially given that it can take many thousands of labeled training examples to adequately train a model.

Accordingly, the present disclosure is directed to training a conversational computing system by leveraging a partially-trained model to help the human annotators apply training labels to new training examples. Specifically, via a training interface, a machine learning model may be provided with an initial query—e.g., user utterance. Notably, the machine learning model has already been at least partially trained based on prior examples. Thus, based on the initial query, the machine learning model generates an initial plurality of candidate actions, which are presented to a human annotator via the training interface. These candidate actions may include, for example, response utterances to the initial query, computer-executable plans generated by the machine learning model, or other suitable actions that the machine learning model may generate in response to the initial query based on prior training. However, this initial plurality of candidate actions may not necessarily include any candidate actions that the human annotator views as suitable given the initial query—e.g., because the initial query uses vocabulary, syntax, or abbreviations on which the machine learning model has not yet been trained. One of the plurality of candidate actions may then be selected via the training interface and associated with the initial query in a labeled data example, which may be used for further training the machine learning model. In this manner, the machine learning model may be more efficiently trained on a wide variety of initial queries, while reducing the need for human annotators to manually compose computer-executable plans. In some examples, the human annotator may paraphrase the initial query, and this paraphrased query may be provided to the machine learning model to give an updated plurality of candidate actions from which the human annotator may select a candidate action. In this way, the selected candidate action can be associated with both the original utterance phrasing and the paraphrase provided by the human annotator, thus making the trained model more robust. In some examples, none of the candidate plans may be appropriate, and the human annotator may edit a candidate plan before selecting. It is believed that providing the human annotator a candidate plan to edit may reduce the training burden compared to having to author a plan from scratch.

Figure 2:
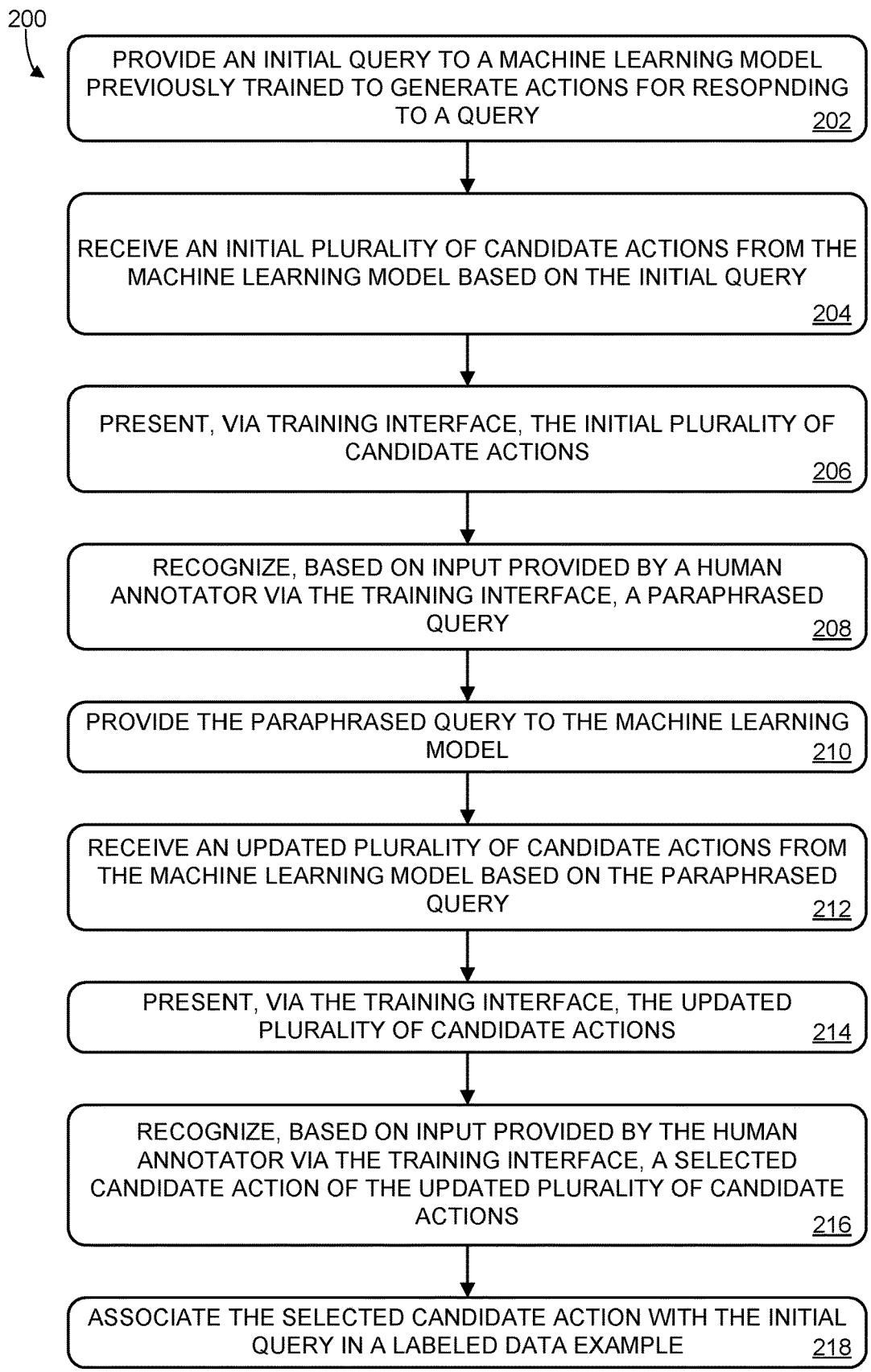
FIG. 2 illustrates an example method of training a conversational computing system.

FIG. 2 illustrates an example method 200 for training a conversational computing system. Method 200 may be implemented on any suitable computing device having a suitable hardware configuration and form factor. In some examples, method 200 may be implemented by computing system 700 described below with respect to FIG. 7.

Figure 3A:
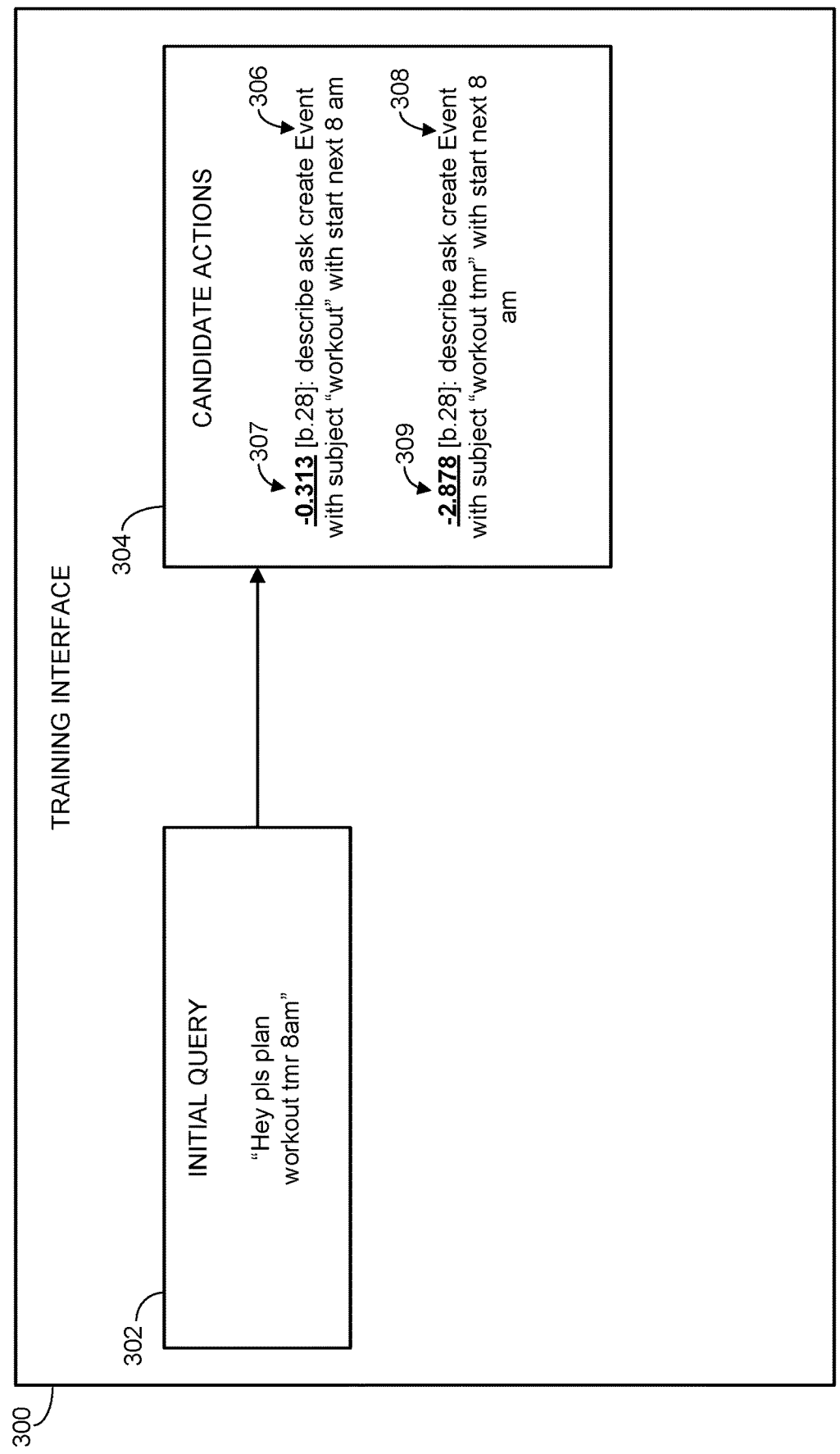
FIGS. 3A and 3B depict an example training interface.

At 202, method 200 includes providing an initial query to a machine learning model previously trained to generate actions for responding to a query. The initial query may in some cases be received from a human annotator via a training interface. An example training interface 300 is depicted in FIG. 3A, including an initial query 302. In other words, the human annotator may manually compose and input the initial query—e.g., by typing, speaking aloud, or using another suitable input interface of the computing device. In other examples, however, the initial query may be an exemplary query from a historical interaction from a human user. Thus, the initial query may be retrieved from a database of queries provided by human users, either stored on the device presenting the training interface (e.g., annotation computing system 112) or retrieved from a remote device (e.g., server 124).

Furthermore, in some cases, the initial query may be provided to a machine learning model executed by the same device that presents the training interface. In other words, using the example of FIG. 1, annotation computing system 112 may both present training interface 114 and execute a machine learning model 102, to which initial queries may be provided. Alternatively, initial queries provided via training interface 114 may be transmitted to a machine learning model implemented by a remote device, such as server 124.

Returning to FIG. 2, at 204, method 200 includes receiving an initial plurality of candidate actions from the machine learning model based on the initial query. In some examples, the candidate actions take the form of computer executable plans having a data flow program syntax. The initial plurality of candidate actions may represent n candidate actions the model, as trained thus far, ranks the highest (e.g., 1, 2, 3, 4, 5, or any other number of candidate actions).

At 206, method 200 includes presenting, via the training interface, the initial plurality of candidate actions. This is illustrated in FIG. 3A. Specifically, training interface 300 includes an initial plurality of candidate actions 304, including candidate actions 306 and 308. Each of candidate actions 306 and 308 are generated by the machine learning model as potential responses to initial query 302. In this example, each of the candidate actions are computer-executable plans defining a sequence of operations of a conversational computing system that would carry out the computer-executable plan in response to a human query in real-world use. Furthermore, in this example the computer-executable plan is in a data-flow programming language of the conversational computing system. In other examples, however, a computer-executable plan may be expressed in another suitable manner.

In FIG. 3A, only two candidate actions are shown in the initial plurality of candidate actions 304. In other examples, however, a machine learning model may generate any number of candidate actions in response to an initial query, and any number of such candidate actions may be presented in the training interface. In other words, in other examples, more than two or fewer than two candidate actions may be presented in a training interface in response to an initial query.

Furthermore, the order in which the candidate actions are presented optionally may be based on an underlying ranking or confidence for the candidate actions output by the machine learning model. In other words, the machine learning model may be configured to rank candidate actions, and the initial plurality of candidate actions may be a plurality of top-ranked candidate actions for the initial query. Candidate actions may be ranked according to any suitable criteria. In some examples, the machine learning model may be configured to assess confidence values for candidate actions, and the training interface may be configured to present a confidence value for each candidate action of the initial plurality of candidate actions. This is shown in FIG. 3A, in which candidate action 306 has a corresponding confidence value 307, and candidate action 308 has a confidence value 309, where more negative values correspond to lower confidence. In other examples, confidence values may have another suitable format or scale.

However, as discussed above, the initial plurality of candidate actions may not necessarily include any candidate actions that are suitable for the initial query. In the example of FIG. 3A, candidate action 308 would have the conversational computing system create an event having the subject "workout tmr," thus failing to recognize the abbreviation of the word "tomorrow," and failing to determine that the query is referring to the day after the current day. Furthermore, both candidate actions 306 and 308 would have the conversational computing system create an event with a start time of "next 8 am," while an ideal candidate action would have a start time of "tomorrow 8 am," to avoid ambiguity that would arise if the initial query is provided before 8 am.

Figure 3B:
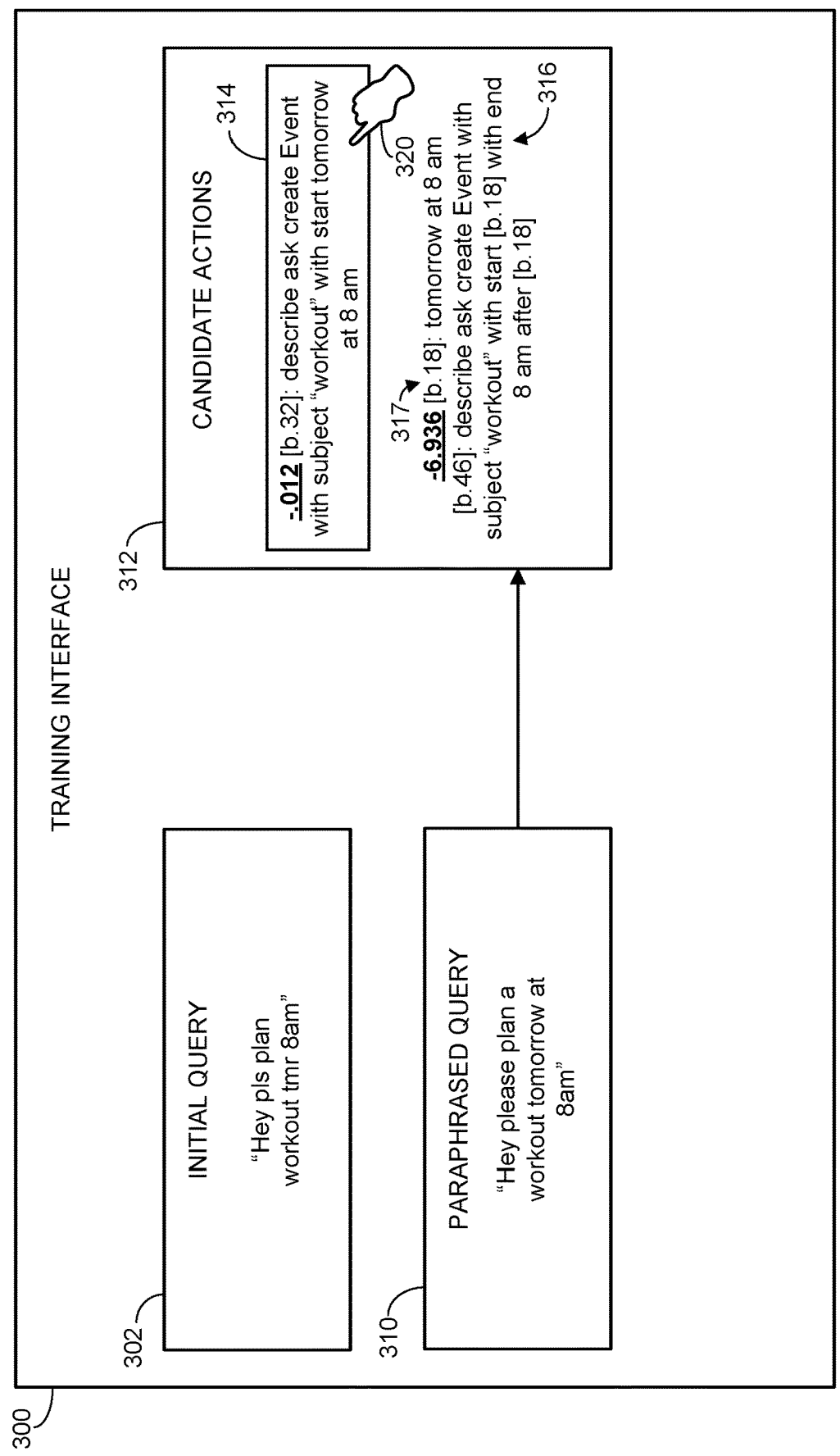

Thus, returning briefly to FIG. 2, at 208 method 200 optionally includes recognizing, based on input provided by a human annotator via the training interface, a paraphrased query. This is shown in FIG. 3B, in which a paraphrased query 310 is shown along with initial query 302. In other words, based on recognizing that none of the initial plurality of candidate actions are ideal for the initial query, the human annotator has provided a paraphrased version of the initial query that may be more consistent with other queries the machine learning model has previously been trained on.

Specifically, the paraphrased query has replaced abbreviations present in the initial query, as well as added the article "a" for clarity. Providing such paraphrasing may be easier than editing the candidate actions, because the paraphrasing need not adhere to any rigid syntax.

Returning again to FIG. 2, at 210 method 200 optionally includes providing the paraphrased query to the machine learning model. At 212, method 200 optionally includes receiving an updated plurality of candidate actions from the machine learning model based on the paraphrased query. At 214, method 200 optionally includes presenting, via the training interface, the updated plurality of candidate actions. This may be done substantially as discussed above with respect to the initial query and initial set of candidate actions.

This is also illustrated in FIG. 3B, in which an updated set of candidate actions 312 is shown in training interface 300. The updated set of candidate actions includes candidate actions 314 and 316. As with the initial set of candidate actions, the updated set may include any number of candidate actions generated by the machine learning model in response to the paraphrased query, and this can include more than or fewer than two candidate actions.

Furthermore, as with the initial set of candidate actions, the updated set may be sorted or organized in any suitable way. For example, the updated set of candidate actions may be ranked and include the top-ranked candidates output by the machine learning model, and thus some candidate actions generated by the model may be omitted from the set displayed in the training interface. The candidate actions may in some cases be ranked according to corresponding confidence values output by the machine learning model.

In FIG. 3B, candidate action 316 is a computer-executable plan including an automatically generated variable 317 that represents a result of executing an operation in the computer-executable plan. Specifically, the automatically-generated variable is indicated by [b.18] and represents "tomorrow at 8 am." Other operations in the computer-executable plan refer back to the automatically-generated variable. It will be understood that automatically-generated variables may be generated for any operations in a computer-generated plan and used in any suitable way.

Returning briefly to FIG. 2, at 216, method 200 includes recognizing, based on input provided by the human annotator via the training interface, a selected candidate action. The selected candidate action can be from the initial plurality of candidate actions, and/or in cases where the user provides a paraphrase, from the updated plurality of candidate actions. This is also illustrated in FIG. 3B, in which the human annotator has selected candidate action 314 via input 320 as the selected candidate action. Typically, the selected candidate action will be one that the human annotator believes is a suitable response to the initial query. The human annotator may select the selected candidate action using any suitable input modality of the computing device presenting the training interface—e.g., a computer mouse, keyboard, touchscreen, vocal interface, or eye-tracking interface.

In some cases, the training interface may be configured for editing candidate actions. For example, in a scenario in which the machine learning model does not output any suitable candidate actions in response to an initial or paraphrased query, the human annotator may edit a computer-executable plan associated with a candidate action to better suit the query. The human annotator may then select the edited candidate action as the selected candidate action. Again, editing of computer-executable plans may be done via any suitable input modality of the computing device.

Returning again to FIG. 2, at 218, method 200 includes associating the selected candidate action with the initial query in a labeled data example. This is schematically illustrated in FIG. 4, which shows a labeled data example 400. Labeled data example 400 includes the initial query 302 as well as selected candidate action 314. Thus, even though the selected candidate action was generated by the machine learning model based on the paraphrased query, the selected candidate action may nonetheless be associated with the initial query.

Additionally, or alternatively, the selected candidate action may be associated in a labeled data example with the paraphrased query. This is schematically illustrated in FIG. 5, which shows another labeled data example 500. This labeled data example also includes the selected candidate action 314, but the selected candidate action is associated with the paraphrased query rather than the initial query. Depending on the implementation, it may be beneficial to associate both the initial and paraphrased queries with the selected candidate action in different labeled data examples, to provide a larger and more diverse body of training data to the machine learning model. Alternatively, only one or the other of the initial and paraphrased queries may be associated with the selected candidate action in a labeled data example.

Figure 6:
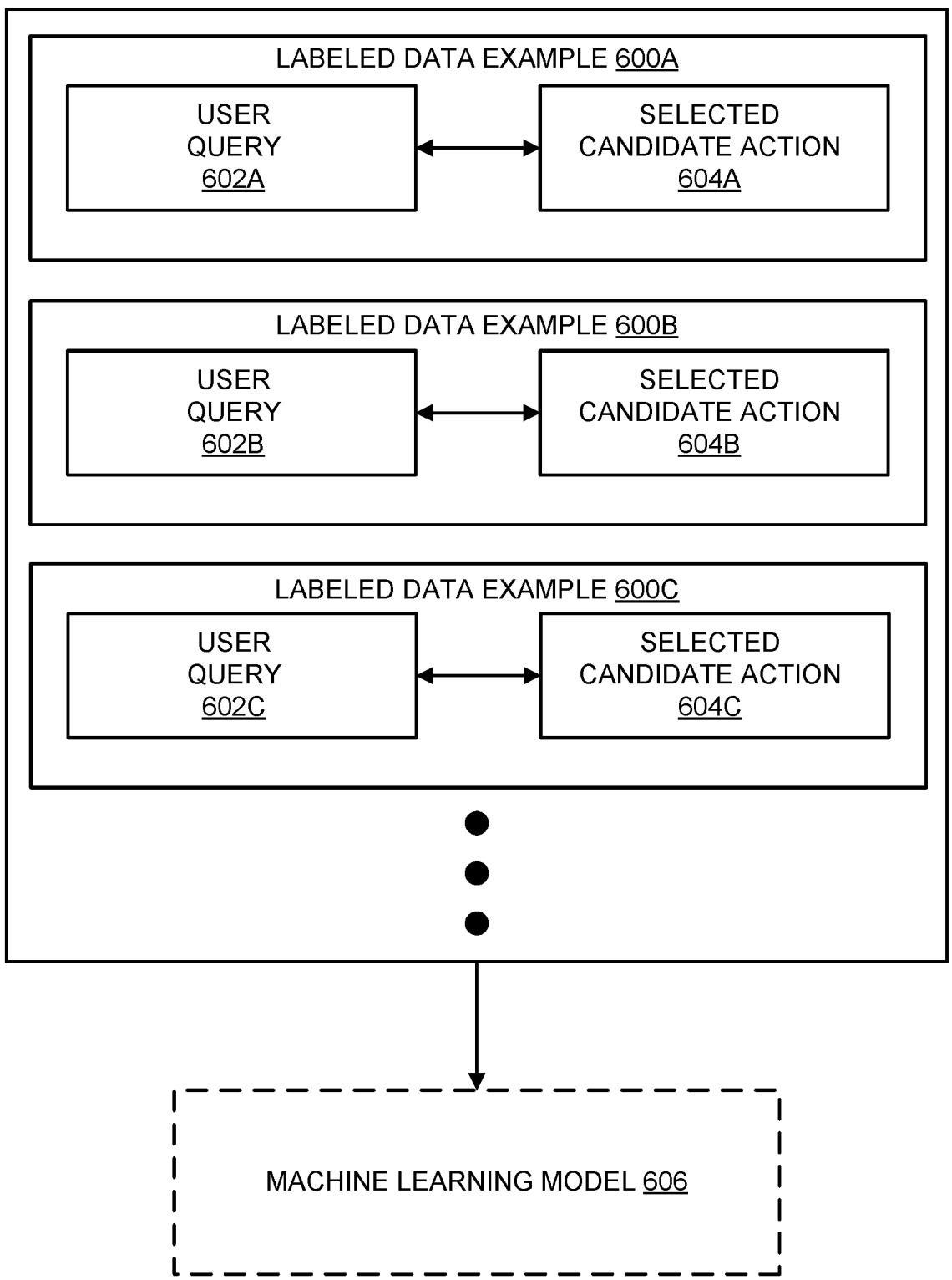
FIG. 6 schematically illustrates retraining of a machine learning model with a plurality of labeled training examples.

Regardless, labeled data examples produced as a result of a human annotator interacting with the training interface may be provided for retraining the machine learning model. The labeled data example indicates the selected candidate action as an exemplary action responsive to the query included in the labeled data example—either the initial or paraphrased query. Retraining is schematically illustrated in FIG. 6, which shows a set of three labeled data examples 600A-600C. Each labeled data example includes a user query 602 and a selected candidate action 604. It will be understood that any number of labeled data examples may be used in retraining, including more than three. Based on the labeled data examples, machine learning model 606 may be retrained to more effectively respond to user queries in the future. The specific training process used will vary depending on the specific ML or NLP models used, as will be described in more detail below.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
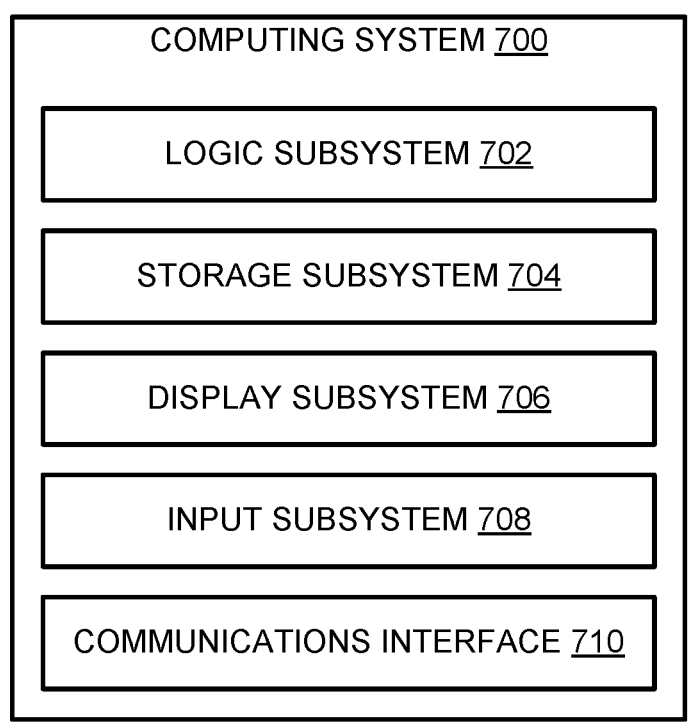
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem 706 may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of training a conversational computing system comprises: providing an initial query to a machine learning model previously trained to generate actions for responding to a query; receiving an initial plurality of candidate actions from the machine learning model based on the initial query; presenting, via a training interface, the initial plurality of candidate actions; recognizing, based on input provided by a human annotator via the training interface, a paraphrased query; providing the paraphrased query to the machine learning model; receiving an updated plurality of candidate actions from the machine learning model based on the paraphrased query; presenting, via the training interface, the updated plurality of candidate actions; recognizing, based on input provided by the human annotator via the training interface, a selected candidate action of the updated plurality of candidate actions; and associating the selected candidate action with the initial query in a labeled data example. In this example or any other example, the selected candidate action includes a computer-executable plan defining a sequence of operations of the conversational computing system. In this example or any other example, the computer-executable plan is in a dataflow programming language of the conversational computing system. In this example or any other example, the training interface is configured for editing the computer-executable plan. In this example or any other example, a computer-executable plan includes an automatically-generated variable representing a result of executing an operation in the computer-executable plan, wherein other operations in the computer-executable computing plan may refer to the automatically-generated variable. In this example or any other example, the method further comprises providing the labeled data example for retraining the machine learning model, wherein the labeled data example indicates the selected candidate action as an exemplary response to the initial query. In this example or any other example, the method further comprises associating the selected candidate action with the paraphrased query in another labeled data example. In this example or any other example, the initial query is received from the human annotator via the training interface. In this example or any other example, the initial query is an exemplary query from a historical interaction with a human user. In this example or any other example, the machine learning model is configured to rank candidate actions, wherein the initial plurality of candidate actions is a plurality of top-ranked candidate actions for the initial query, and the updated plurality of candidate actions is a plurality of top-ranked candidate actions for the paraphrased query. In this example or any other example, the machine learning model is configured to assess confidence values for candidate actions, wherein the training interface is configured to present a confidence value for each candidate action of the initial plurality of candidate actions and for each candidate action of the updated plurality of candidate actions.

In an example, a computing system comprises: a logic subsystem; and a storage subsystem holding instructions executable by the logic subsystem to: via a previously-trained machine learning model, identify an initial plurality of candidate actions for responding to an initial query; present, via a training interface, the initial plurality of candidate actions; receive, from a human annotator via the training interface, a paraphrased query; via the previously-trained machine learning model, identify an updated plurality of candidate actions for responding to the paraphrased query; present, via the training interface, the updated plurality of candidate actions; receive, from the human annotator via the training interface, a selected candidate action of the updated plurality of candidate actions; and associate the selected candidate action with the initial query in a labeled data example. In this example or any other example, the instructions are further executable to re-train the previously-trained machine learning model with the labeled data example. In this example or any other example, the instructions are further executable to store, in the storage subsystem, a further labeled data example associating the selected candidate action with the paraphrased query. In this example or any other example, the selected candidate action includes a computer-executable plan defining a sequence of operations of the computing system, and the computer-executable plan is in a data-flow programming language of the computing system. In this example or any other example, the training interface is configured for editing the computer-executable plan. In this example or any other example, the machine learning model is configured to assess confidence values for candidate actions, wherein the training interface is configured to present a confidence value for each candidate action of the initial plurality of candidate actions and for each candidate action of the updated plurality of candidate actions. In this example or any other example, the previously-trained machine learning model is configured to rank candidate actions, wherein the initial plurality of candidate actions is a plurality of top-ranked candidate actions for the initial query, and the updated plurality of candidate actions is a plurality of top-ranked candidate actions for the paraphrased query.

In an example, a method of training a conversational computing system comprises: providing a query to a machine learning model previously trained to generate actions for responding to a query; receiving a plurality of candidate actions from the machine learning model based on the query, each of the plurality of candidate actions including a computer-executable plan defining a sequence of operations of the conversational computing system in a data-flow programming language of the conversational computing system; presenting, via a training interface, the plurality of candidate actions; recognizing, based on input provided by the human annotator via the training interface, a selected candidate action of the plurality of candidate actions; recognizing, based on input provided by the human annotator via the training interface, edits to the selected candidate action; and associating the selected candidate action, as edited, with the initial query in a labeled data example. In this example or any other example, the machine learning model is configured to rank candidate actions, and the plurality of candidate actions is a plurality of top-ranked candidate actions for the query.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of training a conversational computing system, comprising:
    providing an initial query to a machine learning model previously trained to generate computer-executable code in response to queries;
    receiving an initial plurality of candidate computer-executable code options from the machine learning model based on the initial query, each computer-executable code option corresponding to one or more potential computer-implemented actions performable by the conversational computing system as a response to the initial query;
    presenting, via a training interface, the initial plurality of candidate computer-executable code options;
    recognizing, based on input provided by a human annotator via the training interface, an alternate, paraphrased query corresponding to the initial query for which the initial plurality of candidate computer-executable code options were received;
    providing the paraphrased query to the machine learning model;
    receiving an updated plurality of candidate computer-executable code options from the machine learning model based on the paraphrased query;
    presenting, via the training interface, the updated plurality of candidate computer-executable code options;
    recognizing, based on input provided by the human annotator via the training interface, a selected candidate computer-executable code option of the updated plurality of candidate computer-executable code options; and
    associating the selected candidate computer-executable code option, received in response to the paraphrased query, with the initial query in a labeled data example for future training of the machine learning model to generate computer-executable code in response to queries.

2. The method of claim 1, wherein candidate computer-executable code options are in a data-flow programming language of the conversational computing system.

3. The method of claim 1, wherein the training interface is configured for editing them candidate computer-executable code options.

4. The method of claim 1, wherein a candidate computer-executable code option includes an automatically-generated variable representing a result of executing an operation, and wherein other operations in the candidate computer-executable code option refer to the automatically-generated variable.

5. The method of claim 1, further comprising providing the labeled data example for retraining the machine learning model, wherein the labeled data example indicates the selected candidate computer-executable code option as an exemplary response to the initial query.

6. The method of claim 1, further comprising associating the selected candidate computer-executable code option with the paraphrased query in another labeled data example.

7. The method of claim 1, wherein the initial query is received from the human annotator via the training interface.

8. The method of claim 1, wherein the initial query is an exemplary query from a historical interaction with a human user.

9. The method of claim 1, wherein the machine learning model is configured to rank candidate computer-executable code options, and wherein the initial plurality of candidate computer-executable code options is a plurality of top-ranked candidate computer-executable code options for the initial query, and the updated plurality of candidate computer-executable code options is a plurality of top-ranked candidate computer-executable code options for the paraphrased query.

10. The method of claim 1, wherein the machine learning model is configured to assess confidence values for candidate computer-executable code options, and wherein the training interface is configured to present a confidence value for each candidate computer-executable code option of the initial plurality of candidate computer-executable code options and for each candidate computer-executable code option of the updated plurality of candidate computer-executable code options.

11. The method of claim 1, wherein the selected candidate computer-executable code option is useable by the conversational computing system to interact with a different computing system over a computer network.

12. A computing system, comprising:
a logic subsystem; and
a storage subsystem holding instructions executable by the logic subsystem to:
via a previously-trained machine learning model, identify an initial plurality of candidate computer-executable code options based on an initial query, each computer-executable code option corresponding to one or more potential computer-implemented actions performable as a response to the initial query;
present, via a training interface, the initial plurality of candidate computer-executable code options;
receive, from a human annotator via the training interface, an alternate, paraphrased query corresponding to the initial query for which the initial plurality of candidate computer-executable code options were received;
via the previously-trained machine learning model, identify an updated plurality of candidate computer-executable code options based on the paraphrased query;
present, via the training interface, the updated plurality of candidate computer-executable code options;
receive, from the human annotator via the training interface, a selected candidate computer-executable code option of the updated plurality of candidate computer-executable code options; and
associate the selected candidate computer-executable code option, received in response to the paraphrased query, with the initial query in a labeled data example for future training of the previously-trained machine learning model.

13. The computing system of claim 12, wherein the instructions are further executable to re-train the previously-trained machine learning model with the labeled data example.

14. The computing system of claim 12, wherein the instructions are further executable to store, in the storage subsystem, a further labeled data example associating the selected candidate computer-executable code option with the paraphrased query.

15. The computing system of claim 12, wherein the selected candidate computer-executable code option defines a sequence of operations of the computing system, and is in a data-flow programming language of the computing system.

16. The computing system of claim 15, wherein the training interface is configured for editing the selected candidate computer-executable code option.

17. The computing system of claim 12, wherein the machine learning model is configured to assess confidence values for candidate computer-executable code options, and wherein the training interface is configured to present a confidence value for each candidate computer-executable code option of the initial plurality of candidate computer-executable code options and for each candidate computer-executable code option of the updated plurality of candidate computer-executable code options.

18. The computing system of claim 12, wherein the previously-trained machine learning model is configured to rank candidate computer-executable code options, and wherein the initial plurality of candidate computer-executable code options is a plurality of top-ranked candidate computer-executable code options for the initial query, and the updated plurality of candidate computer-executable code options is a plurality of top-ranked candidate computer-executable code options for the paraphrased query.

19. A method of training a conversational computing system, comprising:
providing an initial query to a machine learning model previously trained to generate computer-executable code in response to queries;
receiving a plurality of candidate computer-executable code options from the machine learning model based on the initial query, each of the plurality of candidate computer-executable code options defining a sequence of operations of the conversational computing system in a data-flow programming language of the conversational computing system;
presenting, via a training interface, the plurality of candidate computer-executable code options;
recognizing, based on input provided by a human annotator via the training interface, an alternate, paraphrased query corresponding to the initial query for which the plurality of candidate computer-executable code options were received;

providing the paraphrased query to the machine learning model;

receiving an updated plurality of candidate computer-executable code options from the machine learning model based on the paraphrased query;

presenting, via the training interface, the updated plurality of candidate computer-executable code options;

recognizing, based on input provided by the human annotator via the training interface, a selected candidate computer-executable code option of the updated plurality of candidate computer-executable code options;

recognizing, based on input provided by the human annotator via the training interface, edits to the selected candidate computer-executable code option; and associating the selected candidate computer-executable code option, as edited, with the initial query in a labeled data example for future training of the machine learning model to generate computer-executable code in response to queries.

20. The method of claim 19, wherein the machine learning model is configured to rank candidate computer-executable code options, and wherein the plurality of candidate computer-executable code options is a plurality of top-ranked candidate computer-executable code options for the initial query.

* * * * *